US008625792B2

(12) United States Patent
Chen et al.

(10) Patent No.: US 8,625,792 B2
(45) Date of Patent: Jan. 7, 2014

(54) METHODS AND APPARATUS TO REDUCE CHANNEL SWITCHING TIME

(75) Inventors: An Mei Chen, San Diego, CA (US); Jangwon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 931 days.

(21) Appl. No.: 12/353,885

(22) Filed: Jan. 14, 2009

(65) Prior Publication Data

US 2009/0183196 A1    Jul. 16, 2009

Related U.S. Application Data

(60) Provisional application No. 61/021,583, filed on Jan. 16, 2008, provisional application No. 61/124,815, filed on Apr. 10, 2008.

(51) Int. Cl.
*H04N 7/38* (2006.01)

(52) U.S. Cl.
USPC .......................................... 380/239

(58) Field of Classification Search
USPC .................................. 380/239, 241
See application file for complete search history.

(56) References Cited

U.S. PATENT DOCUMENTS

| | | | | |
|---|---|---|---|---|
| 5,349,641 | A * | 9/1994 | Coutrot et al. | 380/241 |
| 6,766,451 | B1 * | 7/2004 | Van Rijnsoever | 713/160 |
| 2002/0191789 | A1 * | 12/2002 | Kudelski et al. | 380/241 |
| 2005/0013440 | A1 * | 1/2005 | Akiyama et al. | 380/277 |
| 2005/0141475 | A1 * | 6/2005 | Vijayan et al. | 370/345 |
| 2006/0195752 | A1 | 8/2006 | Walker et al. | |
| 2007/0016920 | A1 | 1/2007 | Shin et al. | |
| 2009/0028331 | A1 * | 1/2009 | Millar et al. | 380/255 |
| 2009/0077585 | A1 * | 3/2009 | Singhai et al. | 725/39 |
| 2013/0177010 | A9 * | 7/2013 | Vijayan et al. | 370/345 |

FOREIGN PATENT DOCUMENTS

| | | |
|---|---|---|
| CN | 1404694 A | 3/2003 |
| CN | 1574958 A | 2/2005 |
| CN | 1868206 A | 11/2006 |
| JP | 2003521175 A | 7/2003 |
| JP | 2007028601 A | 2/2007 |
| KR | 20070074562 A | 7/2007 |
| WO | 2005020564 | 3/2005 |

OTHER PUBLICATIONS

International Preliminary Report On Patentability, PCT/US2009/031301, International Preliminary Examining Authority, European Patent Office, Mar. 4, 2010.
International Search Report and Written Opinion—PCT/US2009/031301—ISA/EPO—May 26, 2009 (080559WO).

* cited by examiner

*Primary Examiner* — Kambiz Zand
*Assistant Examiner* — Abiy Getachew
(74) *Attorney, Agent, or Firm* — Fulbright & Jaworski LLP

(57) ABSTRACT

Methods and apparatus to reduce channel switching time. A method for channel switching includes bundling entitlement control messages (ECMs) to generate bundled ECMs that comprise decryption keys associated with a first content channel and one or more additional content channels, respectively, and transmitting the bundled ECMs with the first content channel. An apparatus for channel switching includes key acquisition logic configured to receive bundled ECMs that comprise decryption keys associated with a first content channel and one or more additional content channels, respectively, processing logic configured to receive a request to render a second content channel that is part of the one or more additional content channels, and decryption logic configured to utilize a selected decryption key obtained from the bundled ECMs to decrypt the second content channel.

48 Claims, 7 Drawing Sheets

METHODS AND APPARATUS TO REDUCE CHANNEL SWITCHING TIME

CLAIM OF PRIORITY UNDER 35 U.S.C. §119

The present Application for Patent claims the benefit of priority to U.S. Provisional Application No. 61/021,583 entitled "Method and Apparatus for Reducing Channel Switching Time" filed Jan. 16, 2008, and assigned to the assignee hereof and hereby expressly incorporated by reference herein.

The present Application for Patent claims the benefit of priority to U.S. Provisional Application No. 61/124,815 entitled "Method and Apparatus for Reducing Channel Switching Time" filed Apr. 10, 2008, and assigned to the assignee hereof and hereby expressly incorporated by reference herein.

BACKGROUND

Real time multimedia content is typically delivered over a distribution network to devices for rendering. For example, the real time content may be organized into content channels that are delivered over the network. Each content channel comprises a "flow" which may include video, audio, closed captioning, overlay information and any other suitable information for rendering on a device. Rendering logic, such as multimedia players and associated hardware and software at the device operate to process the received channels, perform any necessary decoding, descrambling, filtering, transformations, and any other processes necessary to render the content at the device.

Typically, devices are able to switch between received content channels at the request of the device user. For example, a device user may switch between news and entertainment channels by navigating a programming guide and selecting the desired programming. When channel changes are requested, it is desirable that the change occurs very quickly. Otherwise, the device user may experience a long delay, blank screen, distorted images or other undesirable effects.

Most real-time services employ conditional access systems, e.g., encrypting content with a control word (CW) (short term key) to allow only legitimate users to access the content. In order to decrypt the content, an entitlement control message (ECM) is sent that contains the control word that can be used to decrypt the content. Typically, the ECM is delivered in band with the content. The control word may itself be encrypted with a long term key that is provided to devices in an entitlement management message (EMM) when a device purchases or subscribes to receive content. When a device user changes content channels it is desirable to render the new content immediately, however, the rendering process may take a few seconds due the acquisition and decrypting of the appropriate keys. As a consequence, a device user will experience a delay in viewing the selected content channel, which may result in an unsatisfactory user experience.

Therefore, what is needed is a mechanism for use on a device to provide fast channel switching between available content channels to reduce or eliminate delays and provide an enhanced user experience.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes aspects of a channel switching system that operates to provide fast and efficient channel switching at a device. The system is especially well suited for use with devices in wireless networks environments, and may be used by devices in any type of network environment, including but not limited to, communication networks, public networks, such as the Internet, private networks, such as virtual private networks (VPN), local area networks, wide area networks, long haul network, or any other type of data network.

In various aspects, the channel switching system operates to reduce the time needed to acquire keys for decrypting content by bundling ECMs associated with selected content channels. Thus, control words associated with multiple content channels are acquired at the same time. As a result, a channel switch to any of the selected content channels may occur very quickly since the associated control word is available. This provides a very fast and efficient channel switch thereby enhancing the user's experience.

The disclosed examples are designed to enable optimization of network information acquisition by receivers, e.g. DVB-H receivers. For example, DVB-H is a mobile TV specification based on the Digital TV standard for terrestrial television, DVB-T. DVB-T embeds real time audio/video streams directly within MPEG2 Transport Stream (defined in ITU-T H.222.0). The disclosed examples may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

Figure 1:
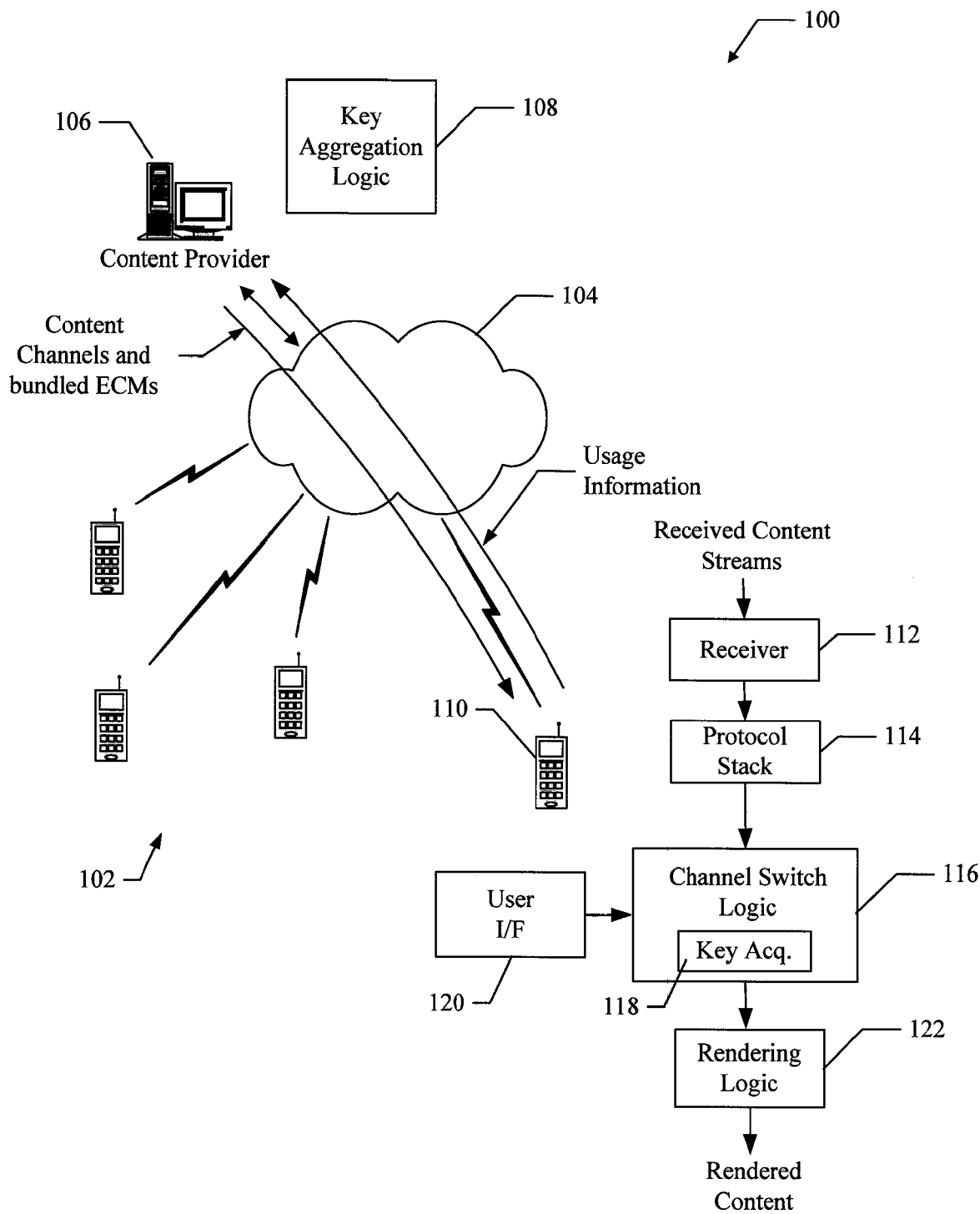
FIG. 1 shows a distribution system that illustrates aspects of a channel switching system.

FIG. 1 shows a distribution system 100 that illustrates aspects of a channel switching system. The system 100 comprises a content provider 106, a plurality of devices, shown generally at 102, and a network 104. The network 104 may be any type and/or combination of wired and/or wireless networks. A content provider 106 is coupled to the network 104 and communicates via any suitable communication channel. For example, the communication channel may be any type of wired or wireless communication channel that allows the content provider 106 to provide content channels for distribution over the network 104. The devices 102 communicate with the network 104 via wireless communication links that allow information to be wirelessly transmitted between the network 104 and the devices 102. For example, the wireless communication links comprise forward communication channels, reverse communication channels, control channels, and/or any other type of communication channel that may be used to communicate information between the network 104 and the devices 102.

The content provider 106 operates to provide content to the devices 102. For example, the content comprises content channels carrying flows that include applications, programs, multimedia content, advertising and/or any other type of content and/or data that may be rendered on the devices 102. The content offered by the content provider 106 may be configured into program packages and/or individual services of media to be offered at the devices 102. The availability of program packages can be based on any of a variety of factors including the geographic location. This set of media programming, in the form of program packages, can be transferred to the device 102 as a set of available packages and costs. Thus, a mobile device can subscribe and un-subscribe to program packages and services, can view the subscribed media and can be provided with updates to the available packages and services.

The content provider 106 operates to encrypt the content channels with one or more encryption keys prior to transmission to the devices 102. For example, the content is encrypted with a short term key (control word) that is frequently changed. The control word may also be encrypted, as part of a key hierarchy, with a long term key that is provided to a device when the device subscribes to a program package. For example, the long term key may be provided to a device in an EMM. In various aspects of the channel switching system, the acquisition time for the appropriate keys for decrypting each content channel is reduced, thereby allowing fast channel switching.

For the purpose of this description, the channel switching system will be described with reference to the device 110. It should be noted that the functions and features of the device 110 may be implemented in any of the devices 102 that are in communication with the network 104. The device 110 may be connected to a computing device such as a laptop computer or desktop computer, or it may be a self contained device such as a personal digital assistant, cell phone, pager or other device. The device 110 may also be called a subscriber unit, mobile device, mobile station, mobile, remote station, remote terminal, user terminal, user agent, or user equipment.

The device 110 comprises receiver 112, protocol stack 114, channel switch logic 116, user interface 120, and rendering logic 122. The receiver 112 operates to receive or has access to the content channels provided by the content provider 106. For example, the receiver 112 receives content channels in a distribution waveform transmitted by the network 104 and provides the received content to the protocol stack 114. The protocol stack 114 makes the received content available for further processing by the channel switch logic 116.

The channel switch logic 116 operates to select a particular content channel for rendering. In an aspect, the user interface 120 operates to receive user input which specifies the particular content channel to be rendered at the device 110. The user interface 120 signals the channel selection to the channel switch logic 116. The channel switch logic 116 then operates to decrypt the content associated with the selected channel by using the associated decryption keys.

To decrypt the desired content, the channel switch logic 116 comprises key acquisition logic 118. The key acquisition logic 118 operates to utilize a long term key provided in an EMM to extract a short term key (CW) encoded with the content. The short term key is then used to decrypt the content. Once the content is decrypted, it is passed to the rendering logic 122 for rendering at the device 110. Thus, when a user requests a channel switch, the channel switch speed is dependent on the speed at which the appropriate keys can be acquired to decrypt the content.

To facilitate fast channel switching, the content provider 106 comprises key aggregation logic 108. The key aggregation logic 108 operates to aggregate keys (i.e., ECMs) to reduce key acquisition times and thereby increase channel switching speeds. For example, the following is list of key aggregation operations provided by the key aggregation logic 108 in various aspects of the channel switching system.

1. Bundle all short term keys associated with all content channels for distribution on every channel.
2. Bundle short term keys associated with a particular channel and its adjacent channels for distribution on that particular channel.
3. Bundle short term keys associated with a particular channel and high probability channels based on usage feedback, program guides, similar content type, or other criteria.

It will be assumed for the following description that the key aggregation logic 108 operates according to operation 2 above to aggregate keys from adjacent content channels. This operation facilitates key acquisition when a device user "channel surfs" up or down to the next available content channel. During operation, the device user may request a channel change to render content from an adjacent channel. The user interface 120 passes the channel selection request to the channel switch logic 116. Since the key aggregation logic 108 has aggregated keys associated with adjacent channels, the key acquisition logic 118 already has access to the keys needed to decrypt the desired adjacent channel. Therefore, since the appropriate key is already available, the channel switch can proceed much faster because it is not necessary for the device to perform time consuming key acquisition operations.

In another aspect, fast channel switching is achieved by the operation of the key acquisition logic 118 at the device 110 to obtain selected keys based on explicit user information or implicit user heuristics. For example, the key acquisition logic 118 maintains a list of channels frequently selected by the device user and operates to pre-acquire keys for these channels at selected time intervals. For example, the key acquisition logic 118 operates to periodically acquire keys for all the channels in the list so that key acquisition can be performed in advance, thereby facilitating fast channel switching to any channel in the list.

Therefore, the channel switch system operates to provide key aggregation and other techniques to reduce key acquisition latencies thereby reducing channel switch times.

Figure 2:
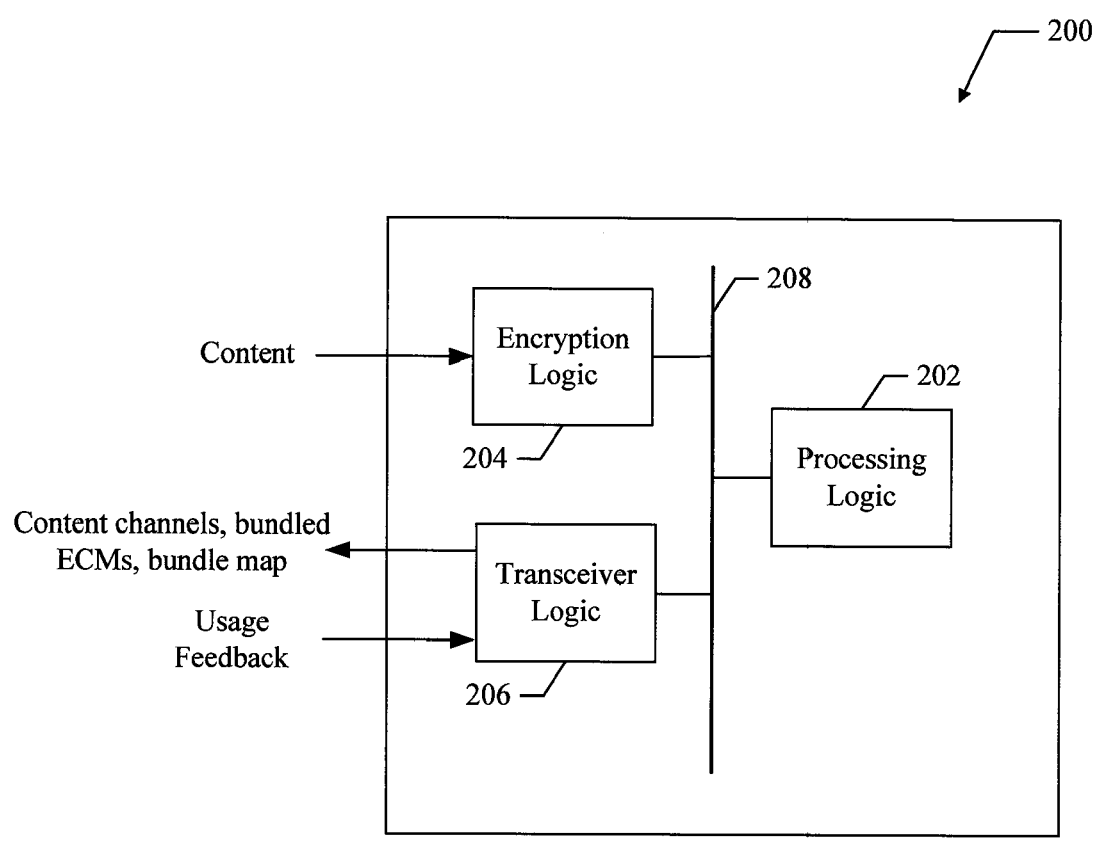
FIG. 2 shows exemplary key aggregation logic for use in aspects of a channel switching system.

FIG. 2 shows exemplary key aggregation logic 200 for use in aspects of a channel switching system. For example, the key aggregation logic 200 is suitable for use as the key aggregation logic 108 shown in FIG. 1. The key aggregation logic 200 comprises processing logic 202, encryption logic 204, and transceiver logic 206, all coupled to a data bus 208.

The encryption logic 204 comprises hardware and/or hardware executing software that operate to encrypt content for transmission over a communication network. In an aspect, the encryption logic 204 operates to encrypt the content channels with the appropriate encryption keys.

In various aspects, the processing logic 202 comprises at least one of a CPU, processor, gate array, hardware logic, memory elements, virtual machine, and/or hardware executing software. Thus, the processing logic 202 generally comprises logic to execute machine-readable instructions to control one or more functional elements of the key aggregation logic 200 via the data bus 208. The processing logic 202 is configured to bundle ECMs for transmission with associated content channels. As described above, ECMs may be bundled in a variety of ways to enhance channel switching speeds by reducing the time required to obtain the appropriate keys to decode desired content. For illustration purposes, the operation of the processing logic 202 to provide ECM bundling is described below. The processing logic 202 is also configured to generate a bundled ECM map that identifies ECMs associated with available content channels.

The transceiver logic 206 comprises hardware and/or hardware executing software that allow the key aggregation logic 200 to communicate with devices on a communication network. For example, the transceiver logic 206 is configured to transmit content and associated bundled ECMs to devices on a communication network. For example, the content and bundled ECMs may be transmitted in unicast, broadcast, or multicast transmissions. The transceiver logic 206 is also configured to receive user feedback that comprises usage information. For example, the usage information identifies channels viewing patterns of device users. In an aspect, this usage information is used to determine how the key aggregation logic 200 bundles ECMs. In another aspect, the transceiver logic 206 is configured to transmit the bundled ECM map that identifies ECMs associated with available content channels. For example, the transceiver logic 206 may transmit the bundled ECM map over a control channel or overhead channel to devices on a communication network.

Adjacent Channel ECM Bundling

Let A be defined as a list of available content channels, for example, A={a, b, c, d, e, f . . . }. Then for any particular channel, two adjacent channels may be determined as channels that are adjacent to the particular channel in the list. For example, the list may be derived from a program guide that includes all available content channels. For any particular channel there are two adjacent channels (i.e., one up and one down assuming wrap-around from the last channel in the list to the first channel in the list). In one implementation, the processing logic 202 operates to bundle ECMs for adjacent channels so that for any particular channel decryption keys for that particular channel and decryption keys for the adjacent channels will be bundled together. Therefore, a user device is able to perform fast channel switching to the adjacent channels after obtaining the bundle ECMs associated with the particular channel.

Selected Channels for ECM Bundling

Let c be a particular channel. Then, A(c) may be defined as a list of channels a device user has high a probability of switching to from channel c. For example, let A(c)={x, y, z . . . }. Then, channel x has the highest probability of being switched to from channel c. Channel y has the next highest probability, and then z, and so on.

The processing logic 202 operates to provide multiple ways to determine selected channels for ECM bundling. For example, the selected channels may be determined from distribution system configuration information, a program guide, usage information, content type, or other criteria. For example, selected channels may be determined from usage information provided by devices in communication with the network. By processing the channel viewing history of these devices, the processing logic 202 operates to determine a list of high probability channels associated with any particular channel.

The processing logic 202 operates to bundle ECMs associated with each channel based on these high probability lists so that for any particular channel for which decryption keys have been acquired, decryption keys for the associated high probability channels will also be acquired. Therefore, fast channel switching to the high probability channels can be achieved.

During operation, the processing logic 202 operates to bundle ECMs associated with particular channels so that control words associated with adjacent/selected channels can be obtained by a device that is attempting to decode a particular channel. The adjacent/selected channels may be determined using any of the methods described above. The content channels and their associated bundled ECMs are then transmitted to devices using the transceiver logic 206. Therefore, fast channel switching at a device can be performed when switching between the adjacent/selected channels since the bundled ECMs provide the appropriate keys for these channels as well as the current channel.

In another aspect, the processing logic 202 operates to generate a bundled ECM map that identifies the ECMs associated with each content channel. This bundled ECM map is then transmitted to the devices by the transceiver logic 206 using any suitable transmission channel. It should be noted that the bundled ECM map may not be generated if the system is configured to perform adjacent channel ECM bundling since devices can determine the bundling information without having to receive and decode a bundled ECM map.

In various aspects, the channel switching system comprises a computer program product having one or more program instructions ("instructions") or sets of "codes" stored or embodied on a machine-readable medium. When the codes are executed by at least one processor, for instance, a processor at the processing logic 202, their execution causes the processor to provide the functions of the channel switching system described herein. For example, the machine-readable medium comprises a floppy disk, CDROM, memory card, FLASH memory device, RAM, ROM, or any other type of memory device or machine-readable medium that interfaces to key aggregation logic 200. In another aspect, the sets of codes may be downloaded into the key aggregation logic 200 from an external device or communication network resource. The execution of the sets of codes will cause the key aggregation logic 200 to provide aspects of a channel switching system as described herein.

Figure 3:
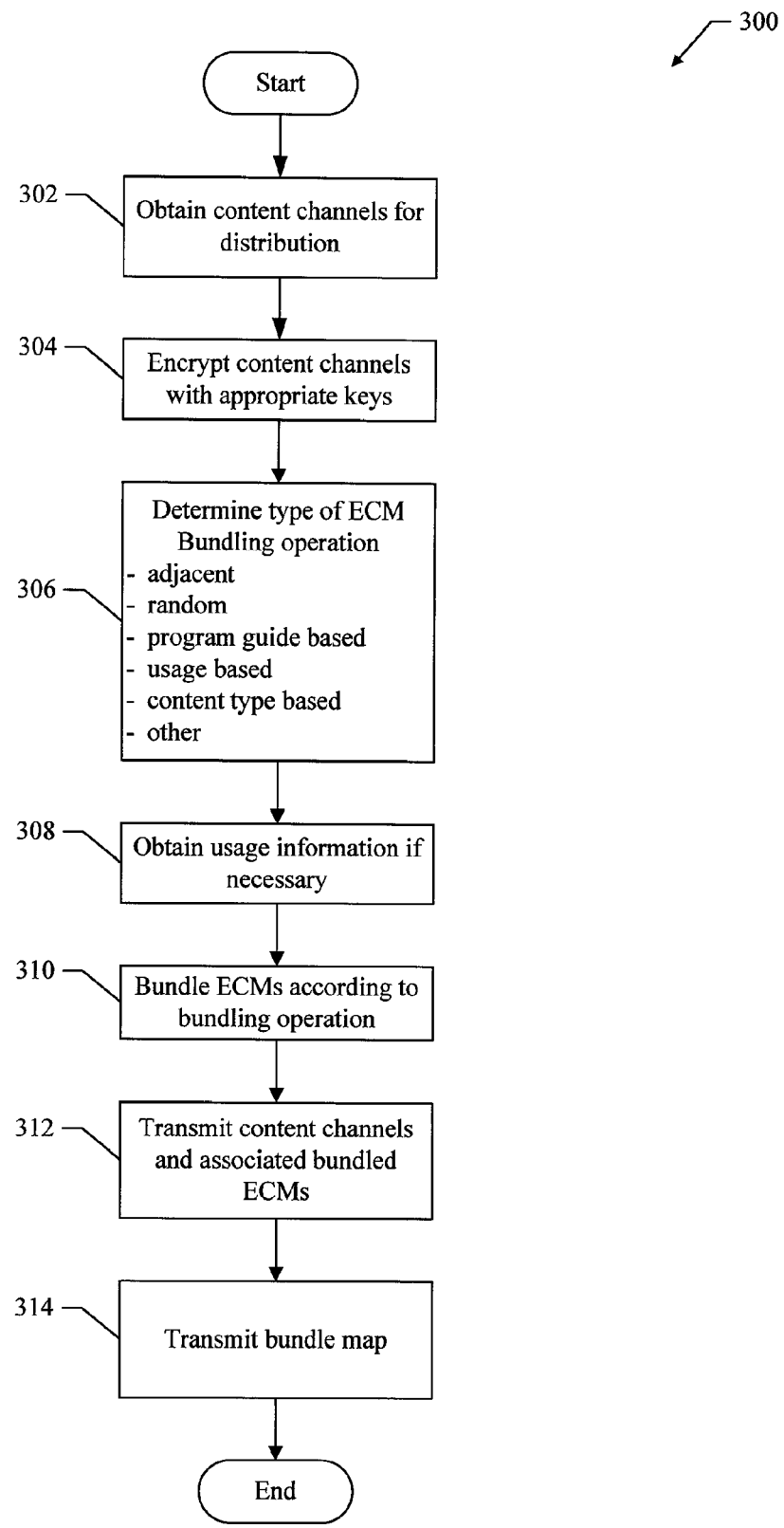
FIG. 3 shows an exemplary method for providing aspects of a channel switching system.

FIG. 3 shows an exemplary method 300 for providing aspects of a channel switching system. For clarity, the method 300 will be described with reference to the key aggregation logic 200 shown in FIG. 2. In one or more aspects, the processing logic 202 executes program instructions to perform the functions described below.

At block 302, content is obtained for distribution over a distribution network. For example, the encryption logic 204 obtains content from various network entities for distribution over a distribution network.

At block 304, the content is encrypted with the appropriate keys. For example the encryption logic 204 operates to encrypt the content with the appropriate short term keys or control words.

At block 306, a determination is made as to the type of ECM bundling operation that is to be performed. For example, the bundling operation may be adjacent channel bundling, random channel bundling, program guide based bundling, usage based bundling, content type bundling or any of the bundling operations described above. For example, in adjacent channel bundling, ECMs associated with a particular channel and its adjacent channels are bundled together. In an aspect, the processing logic 202 makes this determination.

At block 308, device usage information is obtained if necessary to perform the selected ECM bundling operation. For example, if the type of ECM bundling determined at block 306 is based on usage information obtained from devices; the transceiver logic 206 obtains usage information from the devices on a distribution network and passes this information to the processing logic 202. The usage information identifies channel selections made by device users and can be used to determine channels associated with ECMs that are to be bundled together. For example, favorite user channels can be determined from the usage information and this can be used to determine how to bundle ECMs.

At block 310, ECMs are bundled according to the determined bundling operation. For example, the processing logic 202 performs a selected ECM bundling operation, which may be based on the adjacent channels, selected channels, program guide, or usage information. Although the bundled ECMs may add some additional size (i.e., hundred bytes) to the content transmission, this is negligible and the resulting reduction of switching time has much more significant impact on the user experience.

At block 312, content channels and associated bundled ECMs are transmitted over a distribution network. In an aspect, the transceiver logic 206 performs this operation.

At block 314, a bundled ECM map is generated that describes how ECMs associated with each content channel are bundled together. For example, in an aspect, the processing logic 202 generates the bundled ECM map. The bundled ECM map is then transmitted to devices by the transceiver logic 206 using an in-band, out of band, overhead channel or using any other available transmission channel. Devices receiving the bundled ECM map can determine how ECMs associated with each channel are bundled together.

Therefore, the method 300 provides aspects of a channel switching system to obtain fast channel switching as a result of bundling selected ECMs and transmitted these bundled ECMs with associated content channels. It should be noted that the method 300 illustrates just one aspect and that changes, additions, or rearrangements of the operations described above may be made without deviating from the spirit and scope of the various aspects.

Figure 4:
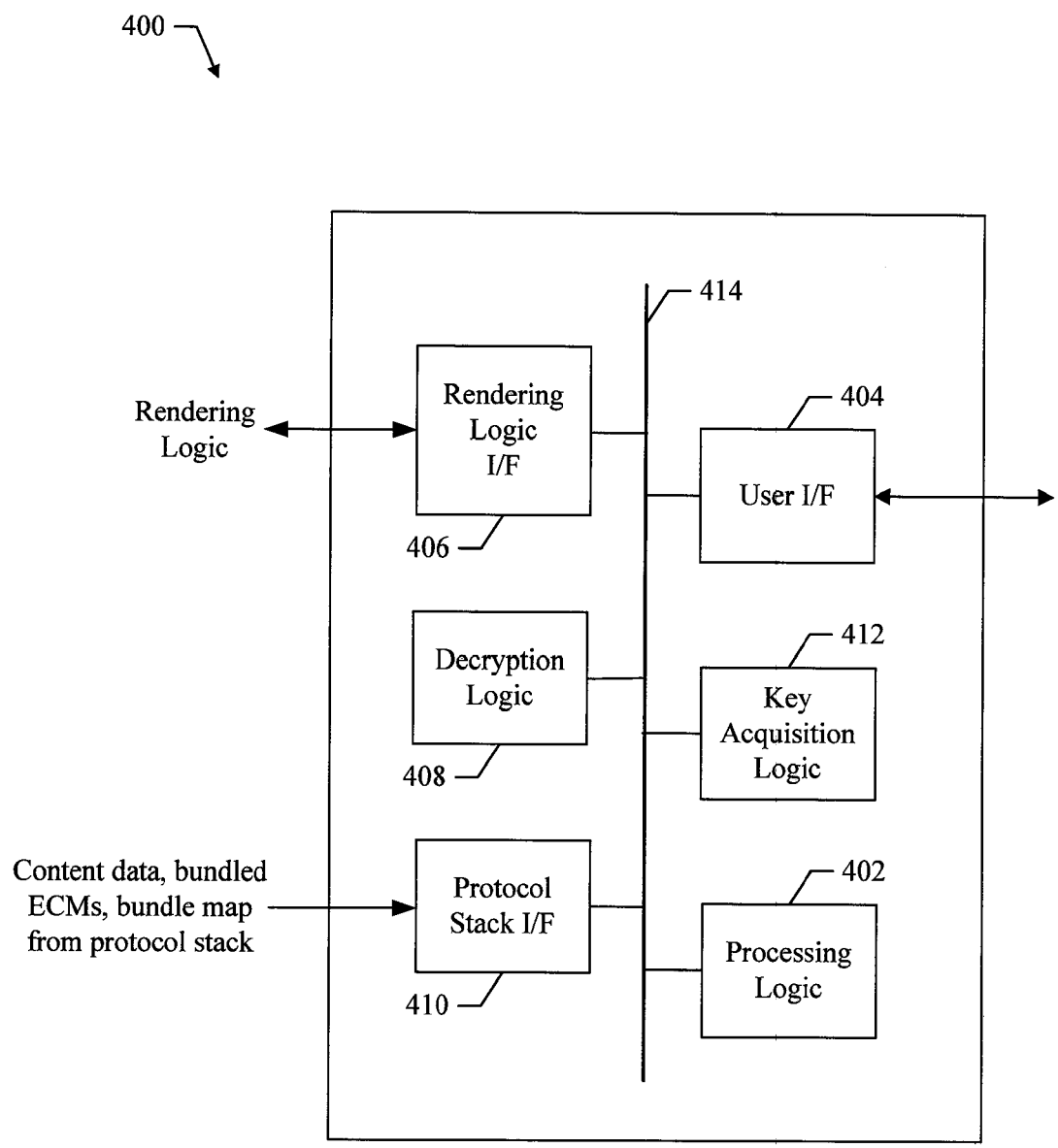
FIG. 4 shows exemplary channel switch logic for use in aspects of a channel switching system.

FIG. 4 shows exemplary channel switch logic 400 for use in aspects of a channel switching system. For example, the channel switch logic 400 is suitable for use as the channel switch logic 116 shown in FIG. 1. The channel switch logic 400 comprises processing logic 402, user interface 404, rendering logic interface 406, decryption logic 408, protocol stack interface 410, and key acquisition logic 412 all coupled to a data bus 414.

In various aspects, the processing logic 402 comprises at least one of a CPU, processor, gate array, hardware logic, memory elements, virtual machine, and/or hardware executing software. Thus, the processing logic 402 generally comprises logic to execute machine-readable instructions to control one or more functional elements of the channel switch logic 400 via the data bus 414.

The user interface 404 comprises hardware and/or hardware executing software that allow the channel switch logic 400 to communicate with a user to receive user input. For example, the user input comprises channel selection requests that request the rendering of content from a selected channel. The user interface 404 passes channel section information to the processing logic 402.

The protocol stack interface 410 comprises hardware and/or hardware executing software that operate to allow the channel switch logic 400 to receive content data, bundled ECMs, and/or other information associated with one or more received content channels. For example, in an aspect, a protocol stack associated with a device may receive channel content from a variety of sources and operates to make this channel content available to the protocol stack interface 410. The protocol stack interface 410 is configured to provide and received content data and bundled ECMs to other elements of the channel switch logic 400.

The rendering logic interface 406 comprises hardware and/or hardware executing software that operate to allow the channel switch logic 400 to pass decrypted content to rendering logic at a device. For example, content that is decrypted from a selected content channel is passed to device rendering logic by the rendering logic interface 406 for rendering at the device.

The decryption logic 408 comprises hardware and/or hardware executing software that operate to allow content data from a selected content channel to be decrypted using keys that have been obtained by the key acquisition logic 412. The decrypted content is passed to the rendering logic interface 406 for rendering.

The key acquisition logic 412 comprises hardware and/or hardware executing software that operate to obtain keys for decrypting content channels. Once the keys are obtained, they are passed to the decryption logic 408. In an aspect, the key acquisition logic 412 obtains keys from bundled ECMs and/or from ECM caching. A description of both is provided below.

Bundled ECMs

In an aspect, the key acquisition logic 412 obtains keys from bundled ECMs that are associated and received with each content channel. For example, when a content channel is acquired for rendering, bundled ECMs associated and received with that content channel are processed by the key acquisition logic 412 to obtain the keys needed to decrypt the content. As part of this process, keys for other content channels may also be obtained when the bundled ECMs are processed. For example, ECMs for adjacent channels that are bundled together are also obtained so that keys for the adjacent channels are available for a fast channel switch to any of the adjacent channels.

Cached ECMs

In another aspect, the key acquisition logic 412 operates to obtain and cache (or store) keys based on explicit user inputs, user heuristics, or other criteria. For example, a user may explicitly indicate the content channels for which the key acquisition logic 412 is to obtain and store ECMs. In another aspect, the key acquisition logic 412 adaptively and cumulatively learns statistics from the user's viewing patterns (heuristics) to determine ECMs to be obtained and stored. For example, the key acquisition logic 412 may log a user's channel preferences and periodically obtain and store ECMs based on those preferences. In other aspects, selected channels may be determined from a Program Guide and ECMs associated with those channels are obtained and stored. Once selected channels are determined, either explicitly or implicitly, the key acquisition logic 412 operates to periodically, or at other time intervals, obtain and cache the associated ECMs. Thus, keys for these channels will be available whenever the device user attempts to switch to these channels.

In another aspect, the key acquisition logic 412 operates to obtain and process a bundled ECM map to determine which ECMs to obtain. For example, the key acquisition logic 412 may not need to obtain particular ECMs if the bundled ECM map indicates that these particular ECMs will be provided with particular content channels. Thus, the key acquisition logic 412 can utilize the bundled ECM map to minimize the number of ECMs that need to be pre-acquired and stored.

As a further example of ECM caching, when a user is watching a particular channel, for instance channel c, the key acquisition logic 412 diligently grabs the content and ECMs for N (configurable parameter) number of other channels. These other channels may be specified either explicitly or implicitly. The tradeoff here is to spend additional power on caching ECMs for selected channels while significantly reducing channel switching time to these selected channels.

During operation of the channel switch logic 400, a user enters channel selections into the user interface 404, which passes the information to the processing logic 402. The processing logic 402 determines if a content channel is currently being rendered. If no content channel is being rendered, the processing logic 402 controls the protocol stack interface 410 to obtain the content for the selected channel and the bundled ECMs associated with the selected channel. The key acquisition logic 412 operates to process the bundled ECMs to obtain keys to decrypt the content and these keys are passed to the decryption logic 408. The key acquisition logic 412 also operates to perform ECM caching to obtain additional keys for one or more other channels, which may or may not have ECMs in the ECM bundle for the current channel. These keys are stored for later use if a channel switch to one of these other channels is required. The processing logic 402 also controls the rendering logic interface 406 to output the decrypted content to rendering logic at the device.

If a channel switch request to switch to a new channel is received by the user interface 404, the key acquisition logic 412 determines if the keys are already available to decrypt the content on the new channel. For example, the keys may have been included in the bundled ECMs associated with the previous channel or stored in the ECM cache. If the keys are available, a fast channel to the new channel can occur since it is not necessary for the key acquisition logic 412 to spend time acquiring the appropriate keys.

In various aspects, the channel switching system comprises a computer program product having one or more program instructions ("instructions") or sets of "codes" stored or embodied on a machine-readable medium. When the codes are executed by at least one processor, for instance, a processor at the processing logic 402, their execution causes the processor to provide the functions of the channel switching system described herein. For example, the machine-readable medium comprises a floppy disk, CDROM, memory card, FLASH memory device, RAM, ROM, or any other type of memory device or machine-readable medium that interfaces to channel switch logic 400. In another aspect, the sets of codes may be downloaded into the channel switch logic 400 from an external device or communication network resource. The sets of codes, when executed, cause the channel switch logic 400 to provide aspects of a channel switching system as described herein.

Figure 5:
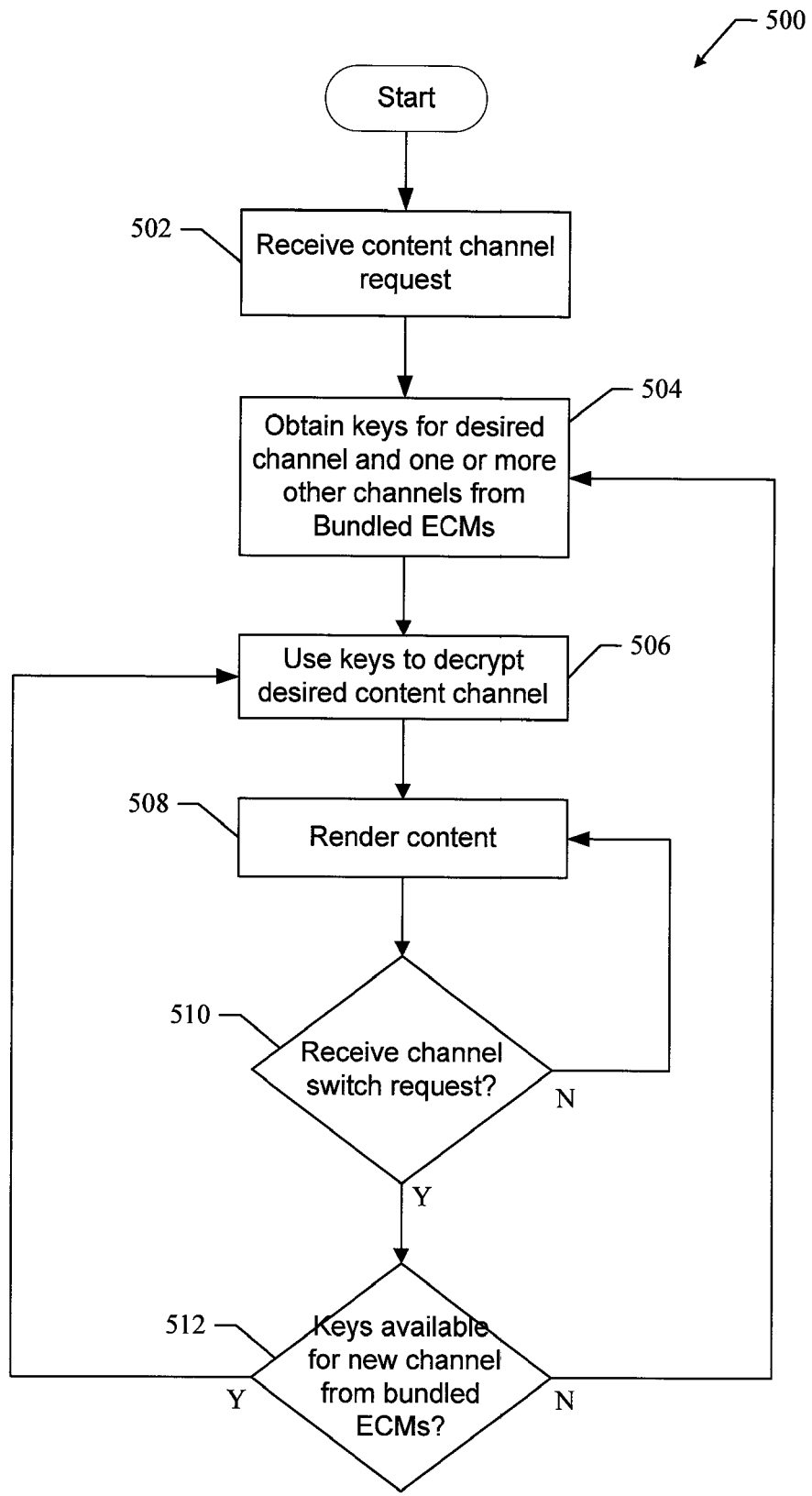
FIG. 5 shows an exemplary method for providing aspects of a channel switching system.

FIG. 5 shows an exemplary method 500 for providing aspects of a channel switching system. For clarity, the method 500 will be described with reference to the channel switch logic 400 shown in FIG. 4. In one or more aspects, the processing logic 402 executes program instructions to perform the functions described below. The method 500 illustrates the operation to perform fast channel switching based on receiving bundled ECMs.

At block 502, a request to render a content channel is received. For example, the request is received from the device user by the user interface 404.

At block 504, keys for the desired content channel are obtained. In an aspect, bundled ECMs associated with the desired content channel are received by the protocol stack I/F 410 and passed to the key acquisition logic 412. The key acquisition logic 412 operates to process the bundled ECMs to obtain the appropriate keys to decrypt the desired content channel. In addition, the key acquisition logic 412 obtains additional keys to decrypt one or more other content channels. These additional keys are obtained from the bundled ECMs.

At block 506, the desired content channel is decrypted. In an aspect, the decryption logic 408 operates to decrypt the desired content channel using the appropriate keys.

At block 508, the content is rendered on the device. In an aspect, the rendering logic interface 406 outputs the decrypted content to rendering logic for rendering on the device.

At block 510, a determination is made as to whether a channel switch request has been received. In an aspect, a device user inputs a channel switch request using the user interface 404. The processing logic 402 operates to determine if a channel switch request has been received. If a channel switch request has not been received the method proceeds to block 508. If a channel switch request has been received the method proceeds to block 512.

At block 512, a determination is made as to whether the appropriate keys are available to decrypt the desired new channel. In an aspect, the key acquisition logic 412 operates to determine if the appropriate keys have been received in the bundled ECMs. If the keys are not available the method proceeds to block 504. If the keys are available the method proceeds to block 506.

Therefore, the method 500 provides aspects of a channel switching system to provide fast channel switching as a result of receiving and processing bundling ECMs that are associated with content channels. It should be noted that the method 500 illustrates just one aspect and that changes, additions, or rearrangements of the operations described above may be made without deviating from the spirit and scope of the various aspects.

Figure 6:
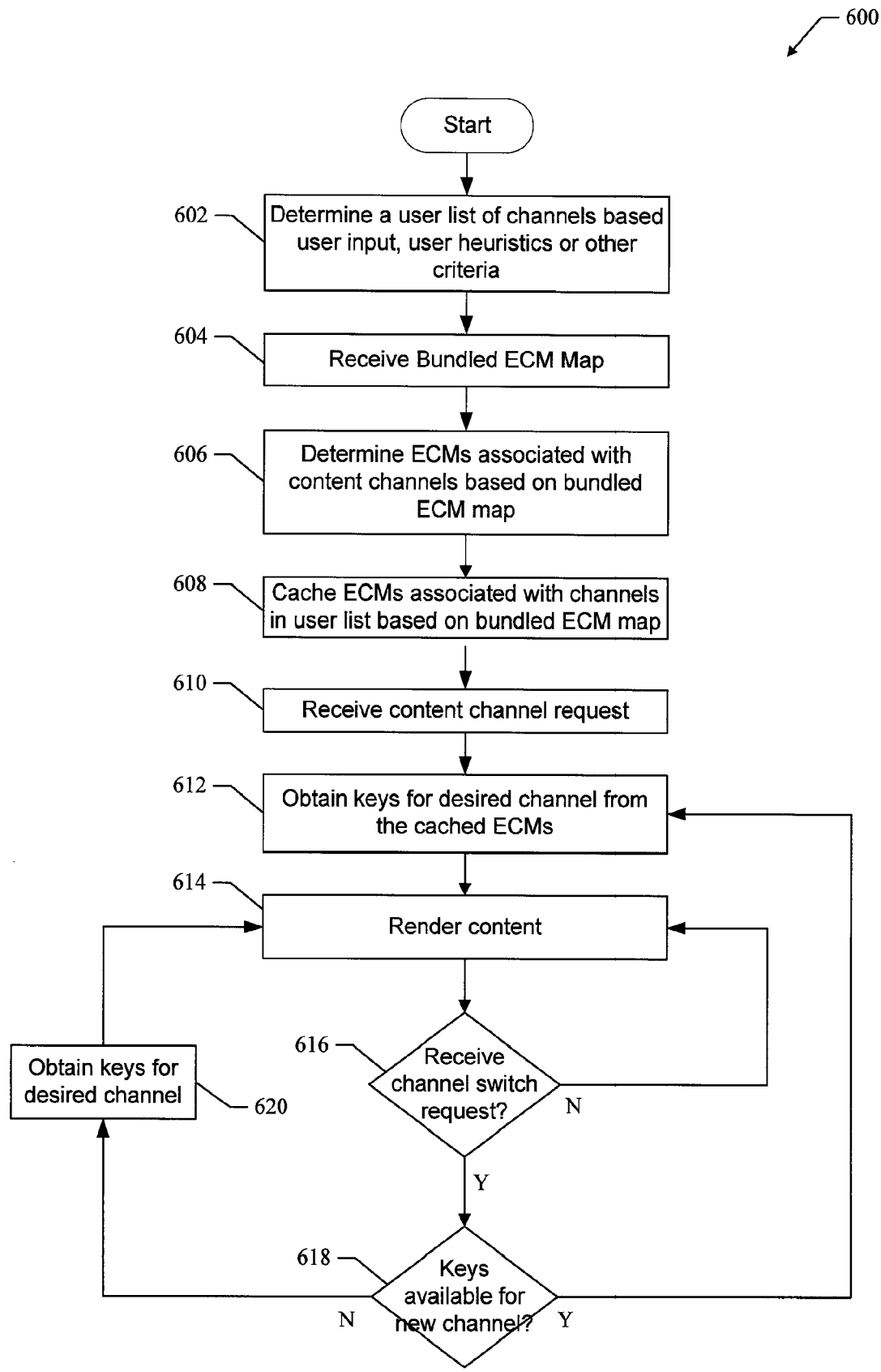
FIG. 6 shows an exemplary method for providing aspects of a channel switching system.

FIG. 6 shows an exemplary method 600 for providing aspects of a channel switching system. For clarity, the method 600 will be described with reference to the channel switch logic 400 shown in FIG. 4. In one or more aspects, the processing logic 402 executes program instructions to perform the functions described below. The method 600 illustrates operations to perform fast channel switching based on receiving bundled ECMs and caching ECMs according to a user list maintained at a device.

At block 602, a user list of channels is determined based on user input, user heuristics, or any other criteria. For example, the key acquisition logic 412 operates to determine the user list.

At block 604, a bundled ECM map is received. For example, the bundled ECM map is received in a control channel by the processing logic 402. The bundled ECM map comprises a mapping of content channels and bundled ECMs. In one implementation, the bundled ECM map is empty or not received indicating that ECM bundling is not utilized or that a known bundling operation (such as adjacent channel bundling) has been performed and so devices do not need to receive and process a bundled ECM map.

At block 606, ECMs associated with content channels are determined from the bundled ECM map. For example, the processing logic 402 operates to process the received bundled ECM map to determine which ECMs are bundled with each content channel.

At block 608, ECMs associated with channels in the user list are obtained and stored (i.e., cached). For example, the key acquisition logic 412 operates to cache these ECMs based on the bundled ECM map. For example, the number of ECMs that are pre-acquired and cached may be minimized by determining how ECMs are bundled with the content channels based the bundled ECM map, and then pre-acquiring ECMs from the user list that may not be available based on the ECM bundling. For example, the user list may specify that ECMs for channels (2, 3, 4, 5, 6) need to be acquired and cached. If the bundled ECM map indicates that ECMs for channels (2, 3, 4) are bundled together, then the key acquisition logic 412 need only pre-acquire and cache ECMs associated with channels (5, 6).

At block 610, a content channel request is received. For example, the content channel request is received by the user interface 404 and passed to the key acquisition logic 412.

At block 612, the appropriate keys to decrypt the desired content channel are obtained from the cached ECMs. In an aspect, the key acquisition logic 412 operates to obtain the appropriate keys.

At block 614, the desired content channel is rendered on the device. For example, the rendering logic interface 406 operates to output the decrypted content to available rendering logic.

At block 616, a determination is made as to whether a request for a channel switch has been received. In an aspect, the processing logic 402 makes this determination. If a request for a channel switch has been received, the method proceeds to block 618. If a request for a channel switch has not been received, the method proceeds to block 614.

At block 618, a determination is made as to whether the appropriate keys are available to decrypt the desired content channel. For example, the appropriate keys may be obtained from bundled ECMs associated with the new content channel or from cached ECMs determined from a user list. In an aspect, the key acquisition logic 412 performs this operation. If the appropriate keys are not available, the method proceeds to block 620. If the appropriate keys are available, the method proceeds to block 612.

At block 620, the appropriate keys needed to decrypt the desired content channel are obtained from an ECM associated with the content channel. In an aspect, the key acquisition logic 412 performs this operation. The method then proceeds to block 614.

Therefore, the method 600 provides aspects of a channel switching system to provide fast channel switching as a result of receiving and processing bundling ECMs and caching ECMs according to a user list that was explicitly or implicitly generated. It should be noted that the method 600 illustrates just one aspect and that changes, additions, or rearrangements of the operations described above may be made without deviating from the spirit and scope of the various aspects.

Figure 7:
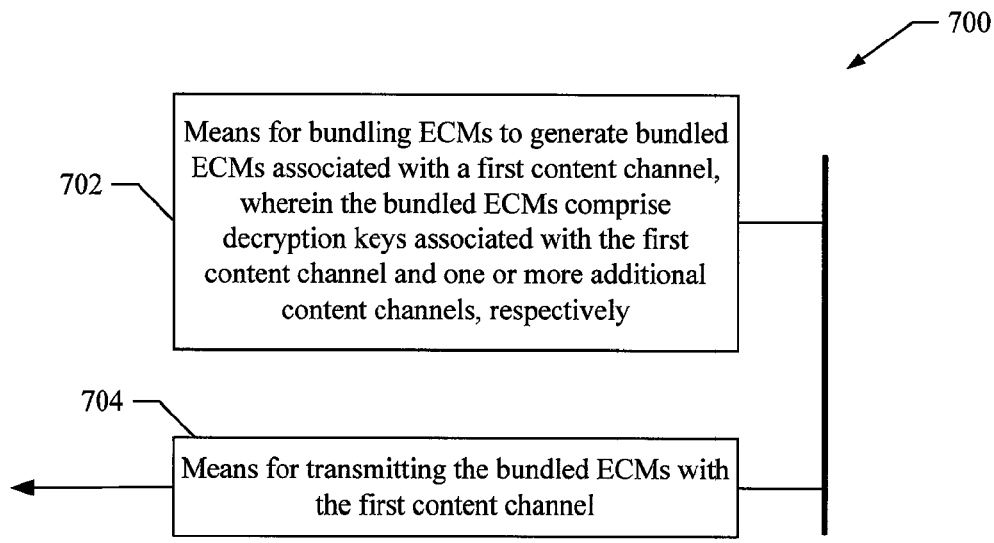
FIG. 7 shows exemplary key aggregation logic for providing aspects of a channel switching system.

FIG. 7 shows exemplary key aggregation logic 700 for providing aspects of a channel switching system. In an aspect, the key aggregation logic 700 is implemented by at least one processor or integrated circuit comprising one or more modules configured to provide aspects of a channel switch system as described herein. For example, each module comprises hardware and/or hardware executing software.

The key aggregation logic 700 comprises a first module that comprises means (702) for bundling ECMs to generate bundled ECMs associated with a first content channel, wherein the bundled ECMs comprise decryption keys associated with the first content channel and one or more additional content channels, respectively. For example, in an aspect, the means 702 comprises the processing logic 202.

The key aggregation logic 700 comprises a second module that comprises means (704) for transmitting the bundled ECMs with the first content channel. For example, in an aspect, the means 704 comprises the transceiver logic 206.

Figure 8:
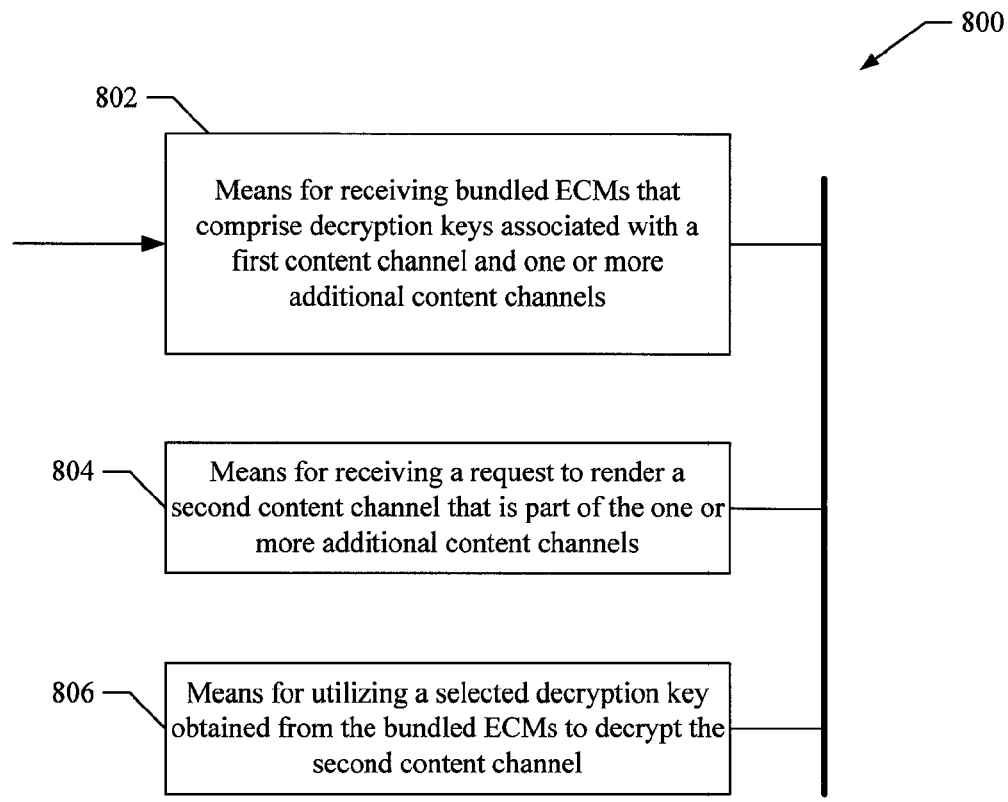
FIG. 8 shows exemplary channel switch logic for providing aspects of a channel switching system.

FIG. 8 shows exemplary channel switch logic 800 for providing aspects of a channel switching system. In an aspect, the channel switch logic 800 is implemented by at least one processor or integrated circuit comprising one or more modules configured to provide aspects of a channel switch system as described herein. For example, each module comprises hardware and/or hardware executing software.

The channel switch logic 800 comprises a first module that comprises means (802) for receiving bundled ECMs that comprise decryption keys associated with a first content channel and one or more additional content channels, respectively. For example, in an aspect, the means 802 comprises the key acquisition logic 412.

The channel switch logic 800 comprises a second module that comprises means 804 for receiving a request to render a second content channel that is part of the one or more additional content channels. For example, in an aspect, the means 804 comprises the processing logic 402.

The channel switch logic 800 also comprises a third module that comprises means 806 for utilizing a selected decryption key obtained from the bundled ECMs to decrypt the second content channel. For example, in an aspect, the means 806 comprises decryption logic 408.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

We claim:

1. A method for channel switching, the method comprising: Bundling, by a processing device, a plurality of entitlement control messages (ECMs) to generate a group of bundled ECMs associated with a first content channel, wherein the group of bundled ECMs comprises decryption keys associated with the first content channel and one or more additional content channels; and transmitting the group of bundled ECMs with the first content channel.

2. The method of claim 1, further comprising selecting the one or more additional channels from available content channels based on at least one of random selection, program guide arrangement, device usage information, and content type.

3. The method of claim 1, further comprising selecting the one or more additional channels from available content channels based on channels adjacent to the first content channel.

4. The method of claim 1, further comprising:
generating a bundle map that identifies ECMs associates with content channels; and
transmitting the bundle map.

5. An apparatus for channel switching, the apparatus comprising: a processing device configured to bundle a plurality of entitlement control messages (ECMs) to generate a group bundled ECMs associated with a first content channel, wherein the group of bundled ECMs comprises decryption keys associated with the first content channel and one or more additional content channels; and transmitting logic configured to transmit the bundled ECMs with the first content channel.

6. The apparatus of claim 5, wherein said processing device is configured to select the one or more additional channels from available content channels based on at least one of random selection, program guide arrangement, device usage information, and content type.

7. The apparatus of claim 5, wherein said processing device is configured to select the one or more additional channels from available content channels based on channels adjacent to the first content channel.

8. The apparatus of claim 5, wherein said processing device is configured to generate a bundle map that identifies ECMs associates with content channels, and said transmitting logic is configure to transmit the bundle map.

9. An apparatus for channel switching, the apparatus comprising: a processing device bundling a plurality of entitlement control messages (ECMs) to generate a group of bundled ECMs associated with a first content channel, wherein the group of bundled ECMs comprises decryption keys associated with the first content channel and one or more additional content channels; and means for transmitting the bundled ECMs with the first content channel.

10. The apparatus of claim 9, further comprising means for selecting the one or more additional channels from available content channels based on at least one of random selection, program guide arrangement, device usage information, and content type.

11. The apparatus of claim 9, further comprising means for selecting the one or more additional channels from available content channels based on channels adjacent to the first content channel.

12. The apparatus of claim 9, further comprising:
means for generating a bundle map that identifies ECMs associates with content channels; and
means for transmitting the bundle map.

13. A computer program product for channel switching, the computer program product comprising: a non-transitory machine-readable medium encoded with codes executable to: bundle a plurality of entitlement control messages (ECMs) to generate a group of bundled ECMs associated with a first content channel, wherein the bundled ECMs comprises decryption keys associated with the first content channel and one or more additional content channels; and transmit the bundled ECMs with the first content channel.

14. A device operable to provide channel switching, the device comprising: an antenna; a processing device configured to bundle a plurality of entitlement control messages (ECMs) to generate a group of bundled ECMs associated with a first content channel, wherein the bundled ECMs comprises decryption keys associated with the first content channel and one or more additional content channels; and transmitting logic coupled to the antenna and configured to transmit the bundled ECMs with the first content channel.

15. A method for channel switching, the method comprising: receiving a group of bundled entitlement control messages (ECMs) that comprises decryption keys associated with a first content channel and one or more additional content channels; receiving a request to render a second content channel that is part of the one or more additional content channels; and utilizing, by a processing device, a selected decryption key obtained from the group of bundled ECMs to decrypt the second content channel.

16. The method of claim 15, wherein said receiving comprises receiving the group of bundled ECMs with the first content channel.

17. The method of claim 15, wherein said receiving the request comprises receiving the request as user input.

18. The method of claim 15, further comprising:
decrypting the first content channel using a first decryption key obtained from the group of bundled ECMs; and
rendering the first content channel.

19. The method of claim 15, further comprising rendering the second content channel.

20. The method of claim 15, wherein said one or more additional content channels are adjacent to the first content channel.

21. The method of claim 15, wherein said one or more additional content channels are selected from available content channels based on at least one of random selection, program guide arrangement, device usage information, and content type.

22. An apparatus for channel switching, the apparatus comprising:
key acquisition logic configured to receive a group of bundled entitlement control messages (ECMs) that comprises decryption keys associated with a first content channel and one or more additional content channels; a processing device configured to receive a request to render a second content channel that is part of the one or more additional content channels; and decryption logic configured to utilize a selected decryption key obtained from the group of bundled ECMs to decrypt the second content channel.

23. The apparatus of claim 22, wherein said key acquisition logic is configured to receive the group of bundled ECMs with the first content channel.

24. The apparatus of claim 22, wherein said processing logic is configured to receive the request as user input.

25. The apparatus of claim 22, wherein said decryption logic is configured to decrypt the first content channel using a first decryption key obtained from the group of bundled ECMs.

26. The apparatus of claim 22, further comprising rendering logic configured to render the second content channel.

27. The apparatus of claim 22, wherein said one or more additional content channels are adjacent to the first content channel.

28. The apparatus of claim 22, wherein said one or more additional content channels are selected from available content channels based on at least one of random selection, program guide arrangement, device usage information, and content type.

29. An apparatus for channel switching, the apparatus comprising: means for receiving a group of bundled entitlement control messages (ECMs) that comprises decryption keys associated with a first content channel and one or more additional content channels; means for receiving a request to render a second content channel that is part of the one or more additional content channels; and a processing device utilizing a selected decryption key obtained from the group of bundled ECMs to decrypt the second content channel.

30. The apparatus of claim 29, wherein said means for receiving comprises means for receiving the group of bundled ECMs with the first content channel.

31. The apparatus of claim 29, wherein said means for receiving the request comprises means for receiving the request as user input.

32. The apparatus of claim 29, further comprising:
means for decrypting the first content channel using a first decryption key obtained from the group of bundled ECMs; and
means for rendering the first content channel.

33. The apparatus of claim 29, further comprising means for rendering the second content channel.

34. The apparatus of claim 29, wherein said one or more additional content channels are adjacent to the first content channel.

35. The apparatus of claim 29, wherein said one or more additional content channels are selected from available content channels based on at least one of random selection, program guide arrangement, device usage information, and content type.

36. A computer program product for channel switching, the computer program product comprising: a non-transitory machine-readable medium encoded with codes executable to: receive a group of bundled entitlement control messages (ECMs) that comprises decryption keys associated with a first content channel and one or more additional content channels; receive a request to render a second content channel that is part of the one or more additional content channels; and utilize a selected decryption key obtained from the group of bundled ECMs to decrypt the second content channel.

37. A device operable to channel switch between real time content channels, the device comprising: an antenna; key acquisition logic coupled to the antenna and configured to receive a group of bundled entitlement control messages (ECMs) that comprises decryption keys associated with a first content channel and one or more additional content channels; processing device configured to receive a request to render a second content channel that is part of the one or more additional content channels; and decryption logic configured to utilize a selected decryption key obtained from the group of bundled ECMs to decrypt the second content channel.

38. A method for channel switching, the method comprising: determining a user list that identifies a plurality of content channels between which channel changes may occur; acquiring a plurality of entitlement control messages (ECMs) associated with the plurality of content channels to produce a group of cached ECMs; receiving a request to render content from a selected content channel that is part of the plurality of content channels; and utilizing, by a processing device, a decryption key obtained from the group of cached ECMs to decrypt the selected content channel.

39. The method of claim 38, wherein said determining comprises determining the user list based on at least one of user input and user heuristics.

40. The method of claim 38, further comprising receiving a bundled ECM map that identifies a group of bundled ECMs associated with the plurality of content channels.

41. The method of claim 40, wherein said acquiring comprises determining selected ECMs to be acquired based on the bundled ECM map so as to minimize the number of ECMs acquired.

42. An apparatus for channel switching, the apparatus comprising: a processing device configured to determine a user list that identifies a plurality of content channels between which channel changes may occur; key acquisition logic configured to acquire a plurality of entitlement control messages (ECMs) associated with the plurality of content channels to produce a group of cached ECMs; interface logic configured to receive a request to render content from a selected content channel that is part of the plurality of content channels; and decrypting logic configured to utilize a decryption key obtained from the group of cached ECMs to decrypt the selected content channel.

43. The apparatus of claim 42, wherein said processing logic is configure to determine the user list based on at least one of user input and user heuristics.

44. The apparatus of claim 42, wherein said key acquisition logic is configured to receive a bundled ECM map that identifies a group of bundled ECMs associated with the plurality of content channels.

45. The apparatus of claim 44, wherein said key acquisition logic is configured to determine selected ECMs to be acquired based on the bundled ECM map so as to minimize the number of ECMs acquired.

46. An apparatus for channel switching, the apparatus comprising: means for determining a user list that identifies a plurality of content channels between which channel changes may occur; means for acquiring a plurality of entitlement control messages (ECMs) associated with the plurality of content channels to produce a group of cached ECMs; means for receiving a request to render content from a selected content channel that is part of the plurality of content channels; and a processing device utilizing a decryption key obtained from the group of cached ECMs to decrypt the selected content channel.

47. A computer program product for channel switching, the computer program product comprising:
a non-transitory machine-readable medium encoded with codes executable to:
determine a user list that identifies a plurality of content channels between which channel changes may occur;
acquire a plurality of entitlement control messages (ECMs) associated with the plurality of content channels to produce a group of cached ECMs.
receive a request to render content from a selected content channel that is part of the plurality of content channels; and
utilize a decryption key obtained from the group of cached ECMs to decrypt the selected content channel.

48. A device operable to channel switch between real time content channels, the device comprising:

an antenna;

a processing device configured to determine a user list that identifies a plurality of content channels between which channel changes may occur; key acquisition logic configured to acquire a plurality of entitlement control messages (ECMs) associated with the plurality of content channels to produce a group of cached ECMs; interface logic configured to receive a request to render content from a selected content channel that is part of the plurality of content channels; and decrypting logic configured to utilize a decryption key obtained from the group of cached ECMs to decrypt the selected content channel.

* * * * *